US008510031B2

(12) United States Patent
Williams et al.

(10) Patent No.: US 8,510,031 B2
(45) Date of Patent: Aug. 13, 2013

(54) SYSTEMS AND METHODS FOR INFORMATION TRANSFORMATION AND EXCHANGE

(76) Inventors: Joseph Williams, Austin, TX (US); William Gaul, Austin, TX (US)

(*) Notice: Subject to any disclaimer, the term of this patent is extended or adjusted under 35 U.S.C. 154(b) by 247 days.

(21) Appl. No.: 12/927,532

(22) Filed: Nov. 17, 2010

(65) Prior Publication Data
US 2011/0125393 A1 May 26, 2011

Related U.S. Application Data

(60) Provisional application No. 61/281,904, filed on Nov. 24, 2009.

(51) Int. Cl.
*G01C 21/26* (2006.01)
(52) U.S. Cl.
USPC .......................... 701/400; 707/705; 707/769
(58) Field of Classification Search
USPC ........ 701/400, 424–426, 418, 24; 705/14.69, 705/14.4, 26.35, 1.1, 7.12, 7.13, 7.29, 14.53, 705/14.54, 14.55; 709/201; 726/2–6; 707/705, 707/758–759
See application file for complete search history.

(56) References Cited

U.S. PATENT DOCUMENTS

| | | | |
|---|---|---|---|
| 5,193,056 A | 3/1993 | Boes | 705/36 R |
| 5,778,367 A | 7/1998 | Wesinger, Jr. et al. | 707/999.01 |
| 5,832,497 A | 11/1998 | Taylor | 707/104 |
| 6,324,538 B1 | 11/2001 | Wesinger, Jr. et al. | 707/10 |
| 6,839,720 B1 * | 1/2005 | Thibodeau | 1/1 |
| 6,850,940 B2 | 2/2005 | Wesinger, Jr. et al. | 707/999.01 |
| 7,028,034 B2 | 4/2006 | Wesinger, Jr. et al. | 705/26.61 |
| 7,269,591 B2 | 9/2007 | Wesinger, Jr. et al. | 707/999.01 |
| 2005/0080702 A1* | 4/2005 | Modi | 705/36 |
| 2006/0190285 A1* | 8/2006 | Harris et al. | 705/1 |
| 2008/0306982 A1* | 12/2008 | Moudy | 707/102 |
| 2009/0254971 A1* | 10/2009 | Herz et al. | 726/1 |
| 2011/0055247 A1* | 3/2011 | Blumberg et al. | 707/769 |
| 2011/0264692 A1* | 10/2011 | Kardell | 707/769 |

* cited by examiner

*Primary Examiner* — Yonel Beaulieu
(74) *Attorney, Agent, or Firm* — Chris Whewell (57) ABSTRACT

Systems and methods for sellers of goods and services for providing information relating to existence and features of what they provide, to buyers using a system as herein described that enables a buyer to identify and obtain collections of information that comprise a subset of the contents of a database having multiple records provided by a plurality of sellers. A seller may use a conventional home or office computer including without limitation PC's and MACINTOSH™ computers to transmit information to a system as provided, which is accessible to users also via a conventional home or office computer. A user specifies desired criteria and the system provides the user a subset of information upon which further decisions by the user can be made. In some embodiments, systems and methods provided relate to information concerning the inventory of new home construction in a selected region, which region may include a general metropolitan area.

21 Claims, 3 Drawing Sheets

SYSTEMS AND METHODS FOR INFORMATION TRANSFORMATION AND EXCHANGE

CROSS-REFERENCES TO RELATED APPLICATIONS

This application claims the benefit of U.S. Provisional Application No. 61/281,904 filed Nov. 24, 2009, the entire contents of which are herein incorporated by reference.

TECHNICAL FIELD

In one aspect the present invention relates to computer-implemented systems and methods useful in providing information concerning real properties which are presently or may come to be made available in the market for purchase. More particularly, it relates to systems and methods in which a provider of real property for purchase or sale may transfer information relating to one or a plurality of real properties to a database, which database is searchable via a search engine. A system provided herein is in some embodiments made accessible via a network, such as a local area network, a wide area network, or via the internet, in order to permit remote users to have on-line access to a properties records database that is searchable through use of a search engine. Management of information relevant to the system is provided by a database manager.

BACKGROUND OF THE INVENTION

Ever since the advent of the exchange of real property between buyers and sellers, communication from a seller of real property to a suitable buyer informing the buyer of the property's availability has been essential prior to commencement of an exchange becomes possible. Towards assisting sellers of real property in commencing sales, various schemes and systems for communication have been devised, including the use of magazine and newspaper advertisements, lists compiled of available properties which are periodically updated, and databases accessible from computer networks which contain descriptions of real property that is available for purchase, being offered for sale to the market by a seller or their agent. While many means of communication between a seller and potential buyers have been employed in relation to existing, pre-owned properties, at present there does not exist any system or method by which potential buyers of new home construction and available lots can identify all newly constructed homes offered for sale in a selected geographical area, price range, etc. for consideration, with real-time accuracy. In this regard the new home construction market lacks established channels between seller and buyers of the same efficiency as is present relative to buyers and sellers in the pre-owned home markets.

At present, real estate agents do not have a web-related system that is completely searchable and that provides an accurate congregation of all, and exclusively, new home construction inventory in a town or other geographical area in one place. Without relevant data, it is difficult for real estate agents to identify new home inventory to sell to qualified buyers. As a group, home builders have never had a tool that allows them to present their inventory exclusively to real estate agents, allowing inventory to be identified and located, let alone in a way that home builders can gather analytical data about which agents are trying to find them and in which communities. Further, in prior art market circumstances, potential conflict of interest have arisen for cases in which a potential buyer that was introduced to a specific property later independently approaches the home builder directly, without a pre-registration of that buyer with an agent.

A real estate agent's time is very valuable and must be split among multiple potential buyers or clients. If buyers were provided with the ability to view potential properties on their own in a more efficient manner than provided by prior art information exchange between buyers and sellers, such could multiply an agent's time, especially if the agent were to have access to knowledge concerning which properties the potential buyer viewed, so the agent could concentrate their efforts on those viewed and like properties when assisting the potential buyer. The Builder community also has had a long-felt need for accurate and forward-thinking data, to ensure it can have ready in the future a proper inventory available to suit the needs of customers in the market.

SUMMARY OF THE INVENTION

Systems for information transformation and exchange which comprise a database containing a plurality of computer-readable records relating to real estate properties that are available for purchase, stored in computer-readable memory, wherein the records each contain a plurality of search engine query-searchable fields relating to features of a real estate property. There is a communication port suitable for transmitting and receiving data and instructions in the form of electrical signals, to and from remote computers. There is also a database manager for creating user accounts and creating, modifying, and deleting entries present in the database, the database manager being connected to the computer-readable memory responsive to a plurality of the remote computers. A database query engine is operatively connected to the memory, the engine is configured to permit a features-based search of the plurality of computer-readable records by system users. There is a process controller operatively connected to at least one of the database manager and the search engine, and a recorder for recording the number of times a particular record is selected for viewing by a user.

BRIEF DESCRIPTION OF THE DRAWINGS

Embodiments of systems provided herein take physical form in certain parts and arrangement of parts, the preferred embodiment of which will be described in detail and illustrated in or with reference to the accompanying drawings which form a part hereof, and wherein.

DESCRIPTION OF THE PREFERRED EMBODIMENT

Figure 1:
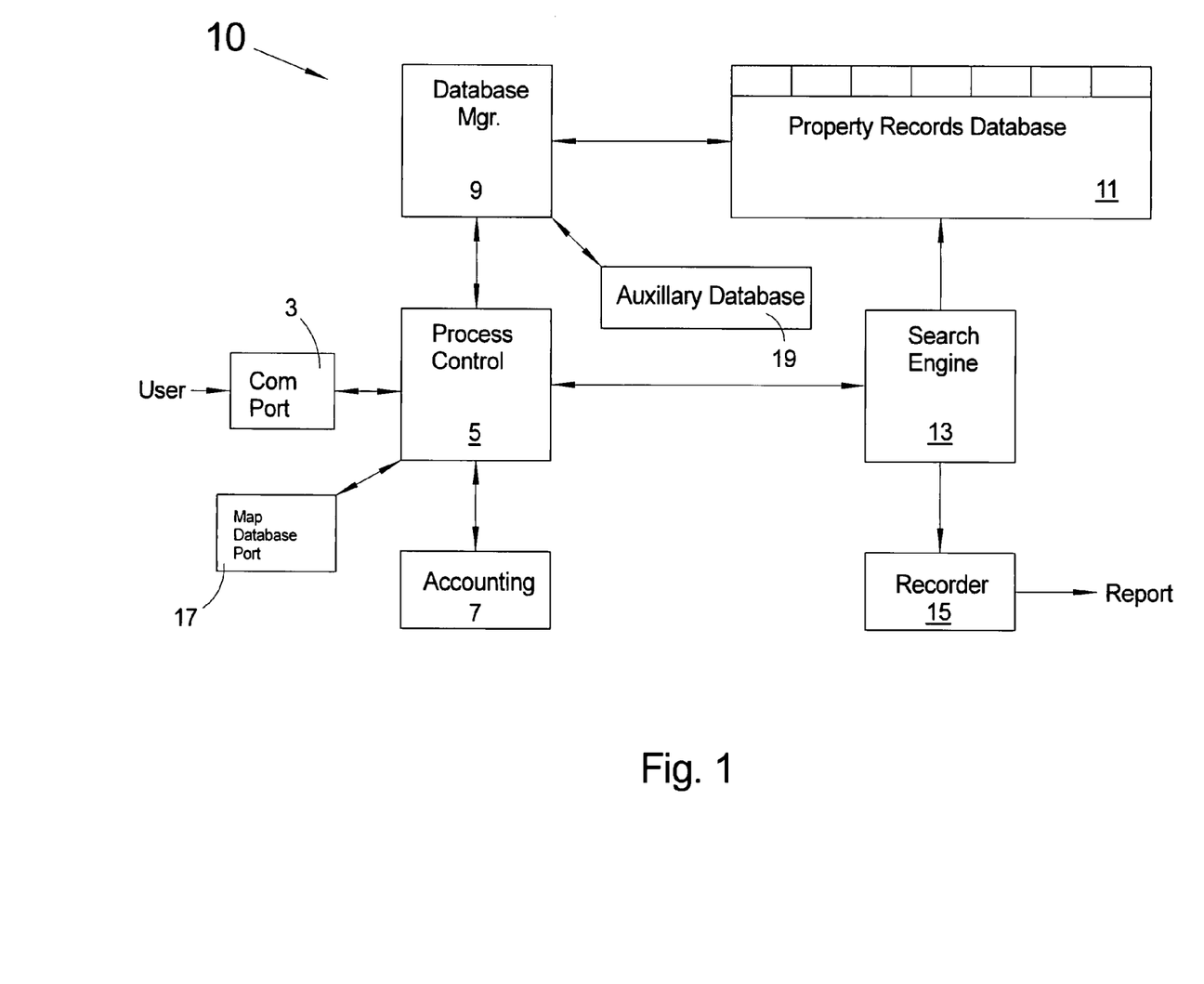
FIG. 1 is a block diagram exemplifying elements and structure of systems provided in accordance with embodiments of the present disclosure.

Referring now to the drawings, which are provided for the purpose of illustrating various features of one or more illustrative embodiments of inventions according to the disclosure only, and not for the purpose of limiting the same, FIG. 1 schematically illustrates features of system 10 provided herein, which system may exist in the form of various embodiments as described. A system as provided herein can be implemented using general-purpose computer hardware as a network site. The general-purpose hardware useful in accordance with the present disclosure includes without limitation Unix workstations, WINDOWS™-based workstations, LINUX-based workstations, and other suitable computer systems and operating systems known in the art, as will be readily appreciated by those skilled in the art after reading this specification and the claims appended hereto. In one embodiment, the hardware is configured and customized by various software modules which include communications software of the type conventionally employed for Internet (and in other embodiments other known types of networks, as selected), and a database management system or module. As appreciated by those skilled in the art, a variety of commercially-available database management systems/languages may be employed to implement a system and method according to this disclosure. These include without limitation Oracle RDBMS, SQL Servers, Microsoft Access, and their functional equivalents. Persons of ordinary skill in the art of database management application programming will be able to make and use a system according to the disclosure herein.

The diagram of FIG. 1 includes a process control module 5 operatively connected to other elements of the system as shown that manages the flow of information through system 10. Exemplary process control modules include units recognized in the art as central processing units (CPU's) and their functional equivalents. System 10 includes a communication port 3 which enables access to system 10 through communications with other computers connected to the network, such communications ports being well known in the art. In illustrative embodiments, the network includes access via the Internet to any number of external computer systems, or access through local or wide area networks to other connected computers either directly or indirectly, such as through modems, routers, and other known distribution means, including wireless networks.

Database memory 11 is operatively connected to other elements of the system as shown and is provided as an electronic storage medium on which information and records pertaining to real estate properties that are desired to be sold may be stored and maintained, thus providing a property records database. The database memory 11 may be any computer-readable or machine-readable memory known in the art that is compatible with and configured to cooperatively function with the remaining components shown, described, or both. Database memory 11 thus provides for electronic storage of a properties records database, which database can take the form, as desired or chosen, of a data file that includes a plurality of records, or a plurality of data files that include a plurality of records, with each record corresponding to a single real estate property that is desired to be sold, which is synonymous with being offered for sale, and available for purchase. In an exemplary embodiment, each record in the property records database includes a number of pre-defined fields containing search parameters, these searchable fields being descriptive of information of the type generally presented in relation to real estate listings, advertisements or both. Optionally, any additional information deemed desirable may be caused to be present in a record by configuring the record fields, whether such additional information is chosen to be provided to be present in searchable fields or non-searchable fields in a record. In one embodiment the pre-defined fields are not defined by the owner, agent, or provider of the properties which are being offered for sale. In alternate embodiments, some or all of the pre-defined fields may be defined by the owner, agent, or provider of the properties which are being offered for sale. In an illustrative embodiment, the search parameters include any of the fields selected from the group consisting of: the acreage of the property, the street address of the property, the location of the property (defined by any one or more of region, city, or state), the city or unincorporated area in which the property is located, the size of any dwelling(s) on the property, the number of bedrooms present in any dwelling(s) on the property, the number of bathrooms present in any dwelling(s) present on the property, information pertaining to utilities, information pertaining to taxes, pricing information, seller incentives, seller's identity, incentives offered by the seller, school data, HOA data, driving directions, hours available for showings of properties, contact persons, multiple elevations, floor plan configuration option(s), floor plan diagrams, physical map locations of property including satellite and hybrid views, virtual tours, and multiple images of properties, and any and all combinations of any of the foregoing.

The properties records database preferably includes some security or password fields which specify which users may have access to the properties records database for the purposes of generating new records in that database relating to new properties that are to be offered for sale, revising existing records, otherwise maintaining existing records, and deleting records from the property records database.

Generally speaking, a system as herein provided may be accessed by a plurality of different providers of properties for sale, including without limitation a plurality of different new home builders who offer homes of new construction for sale, with "new construction" meaning a new home, dwelling or other structure that has had no occupants or use since completion of its construction. In exemplary embodiments, each builder of new homes, or their agent, is able to automatically create through the system from their own remote computer, or in alternate embodiments have created for them by a system administrator, a unique account. As used herein, a remote computer is a computer which is located on premises that is different than the premises at which the property records database is stored in database memory 11. For each unique account, typically corresponding each to a single new home builder, each builder may upload into the property records database a plurality of records for properties which that particular builder is offering for sale, into the properties records database. In addition to new home construction, the property records database may also be caused to contain records having descriptions of features relating to vacant land, sometimes referred to as lots. Features relating to vacant land include all customary features associated with vacant land, including acreage, lot dimensions, ground cover descriptions and other information. Keyword searchable fields are associated with vacant land in a system provided herein, analogously to those provided in relation to new home construction. Thus, in a system according to illustrative embodiments of the disclosure, a builder may list a large number of properties, limited only by their own financial resources, building capabilities, and amount of memory present in the system. A system as provided herein permits a plurality of builders each having a plurality of properties to be offered for sale to upload their properties into the properties records database, which database is thereby caused to contain many listings, potentially into the thousands, and more, depending on the definition of the geographical region intended to be covered by the property records database. Properties may be uploaded to a system as provided herein manually and via computer languages used with networks, such as for example XML.

A system as provided herein also includes a database management module 9 operatively connected to other elements of the system as shown, which database management module manages the creation, revision, and maintenance of records present in the property records database. Suitable such database management modules are well-known in the art and include such database management as Oracle RDBMS, SQL Servers, Microsoft Access and their functional equivalents. There is also a search engine 13 operatively connected to other elements of the system as shown, which search engine may be configured to operate as an iterative search engine, that handles queries made by users to the property records database memory. Search engine 13 may be referred to herein as a database query engine. Suitable search engines capable of searching a database having search fields, searchable fields and the like such as are found in a property records database according to illustrative embodiments herein stored in memory accessible via a network connection may include without limitation the types used by Magellan, Excite, Infoseek, Inktomi, Northern Light, AltaVista, Google, Dogpile, Lycos and Yahoo! and functional equivalents thereof, as search engines are well-known in the art. Other search engines are also suitable, provided they are able to extract a listing of available properties from the property records database in response to a search query by a user, employing search criteria as herein described.

The database management module 9 and search engine 13 may be implemented through commercially-available database management and search engine systems. The property records database may be searched using conventional or known search and query capable software and/or systems.

A user establishing access to the system according to the disclosure though the communication port 3 will be presented with a variety of menus. Communication may be effected through various network-compatible computer languages, including without limitation HTML, XML, SGML, XHTML, and their functional equivalents recognized by those of ordinary skill in the art after reading this disclosure as useful for carrying out the functions herein described.

It is contemplated that users accessing a system according to the disclosure by computer communications will be acting on behalf of either "sellers" or "buyers." Sellers include builders or providers of new home construction (including newly-constructed houses) and their agents, and buyers include potential buyers of real property—persons in the market to buy a new home, and their agents. An agent acting on their own without any buyer or seller affiliation may also be a user, however users other than system administrators who are not acting on behalf of a seller are typically considered to be acting on behalf of a buyer.

Authorized sellers are those users who are authorized to post (upload) new, maintain, and delete property records relating to real property that they desire to offer for sale into the property records database, to retrieve information relating to which buyers have been viewing real property records present in the property records database, and to view trends/metrics of buyer's behavior based on historical data generated by a system provided hereby. Sellers may be granted "write access" to the properties records database through any suitable or chosen identification or verification protocol, as such are well-known to those skilled in the art. A password system or source terminal identification number may be utilized as a part of such protocol to verify authority for "write access." In some embodiments an authorized seller may select a properties records database maintenance option at the main menu.

In illustrative embodiments, once an authorized seller elects to access properties records database maintenance, they are presented with options that include inputting a new posting of a property record relating to a property that is to be offered for sale by creating a new property record in the properties records database, accessing a current posting (property already being offered for sale record), and retrieving information pertaining to which buyers have been viewing properties that the seller has listed on the properties records database. When creating a new properties records database record, in exemplary embodiments a seller is presented with a form to be filled out on-line, or the seller may upload an already-prepared property record to the properties records database. When creating a new property record on-line that is to be included in the property records database according to exemplary embodiments, the system may generate prompts that a seller may respond to which enable the seller to fill pre-determined fields for a new property record listing. The seller may enter narrative for a property description, and also information for the search parameters searchable by the search engine. Any search parameter field which has a restriction on available entries may be presented in the form of a menu. If the number of available entries exceeds a predetermined amount, or if otherwise desirable by system administrators, the entries may be presented in a scroll bar window. The entries may be selected by the user, for example, by using a mouse that enables the user to move a cursor and point and click on appropriate entries. In one non-limiting example, the description of a home being offered for sale on the system will be limited to certain predetermined fields, including those such as geographics, price, square footage of a dwelling, number of bedrooms of a dwelling, number of bathrooms of a dwelling, number of garages of a dwelling, number of stories of a building's construction, which building may be a dwelling. A seller posting a property to the properties records database may be required in some embodiments to select parameters of a home being offered only from a predetermined list appearing in a menu. Such methods of indicating information may be made applicable to other searchable fields, and non-searchable fields relating to the seller or a property.

When an authorized seller elects to access their own current property listings, i.e., those properties they are offering for sale by virtue of the property records database containing a record relating to that property that is searchable by search engine 13 and available for viewing by other users, including sellers, a query may be utilized in order to locate an individual or group of their property listing records existent within the properties records database. A system as provided in an illustrative embodiment will verify that the user has "write access" or authority to modify the properties records. The property records present in the property records database may each be presented as a form having fields which is displayed to the seller, and the seller may modify the fields as desired. A seller may also elect to delete any property record, provided they have appropriate authority.

A system as provided according to an illustrative embodiment herein is configured and programmed to store in database memory 11 or other memory such as an auxiliary database (19, FIG. 1) or memory present in recorder 15, associated information that relates to: the identities of users making search queries, the criteria employed by the user in making search queries, the results of search queries made, the date and time of the queries made, and which individual property records in the property records database have been specifically accessed by a buyer. In some embodiments a system according to the disclosure is configured and programmed so that an authorized user may be provided the option to retrieve records relating to the identities of persons who have been conducting search queries for properties present in the property records database using the system. In some embodiments, a system according to the disclosure is programmed sufficiently so that a seller is granted access to some or all search query results generated by users who have accessed the system over any time period selected by the seller. Search query results within this context include information relating to the identity(ies) of buyers who had previously conducted a search query (either by their name or an on-line identifier which may be an email address or any other unique identifier which may optionally be confidential), criteria used by buyers in formulating individual search queries they've conducted using the system, the results of their search queries, and individual property records which the buyer examined more closely than a mere cursory viewing after executing one or more search queries. In other embodiments, a system according to the disclosure is programmed sufficiently so that a seller is granted access to some or all search query results generated by persons who have accessed the system over a limited time span, defined by a system administrator. In another embodiment, a system according to the disclosure is programmed sufficiently so that a seller is granted access only to the searches made by buyers whose search results have caused the buyers to click on a property record posted to the property records database by that particular seller. As a non-limiting example, if there are three providers A, B, and C of new home construction for sale who have posted records relating to the properties they wish to offer for sale into the property records database, and if there are three potential agents D, E, F, and if each of potential agents D, E, F have searched for a new home using a system as provided herein and their search queries have caused them to click on links on their remote computer connected to the system for properties offered by providers A and B, each of providers A and B can log in to the system and generate a report based on information stored in recorder 15 relating to search queries made. When A logs in and generates such a report, the report shows the identity of D, E, and F, and the properties offered by A which have been viewed by D, E, and F. When B logs in and generates such a report, the report shows the identity of D, E, and F, and the properties offered by B which have been viewed by D, E, and F. When C logs in and generates such a report, the report generated by the information stored in recorder 15 (which may be optionally stored in any memory location present in the system) for C does not show that D, E, and F have viewed properties offered by A, B. For each of these embodiments, business intelligence of different character than previously available via the prior art is provided to the providers of the properties. Although the foregoing non-limiting example involved discussion of sellers A, B, C and potential buyers D, E, F, one of ordinary skill appreciates from this disclosure combined with what is generally known in the art that much larger numbers of both sellers and buyers can be accommodated by a system as provided herein, being limited mostly by bandwidth, processor speed, and the amount of memory in the system, each of which can be upgraded to substantially any desired level of performance.

The administrator of a system according to the disclosure has access to all search queries made, their results, date and time, and the identities of those making/having made the search queries as well as the identities of all sellers whose properties are or have been searched. By acquiring and analyzing such data over time, the system administrator is able to generate reports that identify buying trends in real estate markets. Assembly and operation of a system as provided herein in each city, region or other selected area of a country and compiling all datum relating to search queries and purchases is useful for generating nationwide reports concerning buying habits, changes in buyers' preferences over time, the average time a given property is on the market, and other useful information including floor plan preferences, location preferences, and price points and/or ranges.

Thus, in one embodiment recorder 15 is operatively connected to a system according to the disclosure as shown in FIG. 1 and is configured to receive and store inputs comprising information relating to the identity of users who perform search queries, and the particular property records identified and provided to each user performing the searches, and which of the properties present in the search results for each user are actually clicked on by the individual users to enable them to see the entire contents of a property record listing present in property records database 11. Recorder 15 may employ conventional technology, methods, hardware and software associated with logging the activities of online users, as such are known and understood by those skilled in the art. In one embodiment recorder 15, as with database manager 9 and process control module 5, thus includes a microprocessor having at least one input and output. In one embodiment outputs of search engine 13 are inputted to recorder 15, which recorder 15 further includes a database in computer-readable memory into which are caused to be stored by the processor various fields including those relating to the identity of persons making search queries, their search results, the date and time of their search query(ies), and optionally the search criteria used by each person making a search query, and any other information deemed desirable by a system administrator for every search query made of the contents of the property records database over any time frame specified. The activities of those making search queries are thus related to the particular individuals and stored in memory for later retrieval. Reports concerning the activity of users making queries may be directly outputted from recorder 15 to a printer using conventional hardware, and in alternative embodiments recorder 15 is provided with a communication port and report information may be accessed by remote computers connected to the system. In another embodiment, the output from recorder 15 is directed to database manager 9 and is made available to users through communication port 3. In another embodiment, the output from recorder 15 is directed to process control module 5 and is made available to users through communication port 3. In another alternate embodiment, recorder 15 is disposed within process control module 5.

In addition to the features described, a system according to the disclosure also includes mapping capability of properties identified as the result of a search query. In an illustrative embodiment, a system as provided herein upon completing execution of a search query provides an output on the remote-user's computer screen that includes a listing of at least some of the individual properties identified as a result of the search query, and including their street addresses. In one embodiment, a given search query is limited to a selected specific chosen geographical area, one non-limiting example being the greater San Antonio, Tex. geographical area. The geographical region is in some embodiments selectable by the user. In other embodiments, the system administrator determines which geographical area access is granted to various users to the system relates.

In some exemplary embodiments a system of the disclosure and processes associated with its use, the system hereof generates a map of the geographical area under consideration by a user for locating a property for display on the user's computer screen. The map itself is generated using technology and databases known to those skilled in the art, which include without limitation technologies employed by GOOGLE® Maps and MAPQUEST® maps, although other known mapping technologies and systems are suitable for use herein provided they are capable of generating a map that is displayed on a user's computer screen responsive to the results of a search query made by the user, showing the locations on a generated map of properties identified as a result of a search query of the property records database having been made. Once the street addresses resulting from a search query have been generated, the locations of the properties falling within the scope of the user's search criteria are indicated on the map that is displayed on the user's computer screen. In one embodiment, each location of a property identified as falling within the user's search criteria appears as a tiny balloon on the map displayed on the user's computer screen, although the use of any other type of indicator is within the scope of this disclosure. In a further embodiment, the system is configured to automatically or selectively send driving instructions to a user, via their hand-held or remote device such as an IPhone® device, or their internet-enabled GPS device such as Garmin Global Position Sensing communications device, and like devices. In this fashion a buyer or agent can be provided with driving instructions essentially instantly. This is accomplished using techniques and equipment known to those skilled in the art for determining and sending an electronic message containing driving instructions to a property location, but responsively to a search query made using a system as provided herein. A user who is not a seller effectively tells the system their location and driving instructions are provided from that location to a property described in records relating to real estate properties in the property records database. Effectively telling the system one's location can include the user specifying their own physical location, as is known to those skilled in the art using techniques and equipment associated with such systems as GoogleMaps™, Mapquest™ and like systems.

The map database employed in some embodiments is external to a system according to this disclosure and is made available to the system through a map database port 17 operatively connected to process control module 5. In other embodiments, a map database is resident within a system according to the disclosure, operatively connected to process control module 5 sufficiently to provide output to a remote user's computer screen of the map locations of properties identified by a search query of the system by a user.

FIG. 1 also shows auxiliary database 19 operatively connected to database manager 9. Auxiliary database 19 comprises computer memory and is useful in some embodiments as a location at which is stored, in an computer-readable format, information pertaining to sellers of properties for which records have been or are to be entered into property records database 11, and information pertaining to buyers registered or who have an account with the system. That is, in some embodiments an auxiliary database 19 contains information relating to sellers and buyers of real estate. According to operation of a system according in one embodiment, each buyer is required to establish an account with the system prior to gaining access for making search queries, and enter their personal information including name, email address and optionally any other information deemed desirable by a system administrator, including pre-qualification status for buyers and the identity of any agent they may be working with. In some illustrative embodiments, sellers are also required to establish an account with the system and their account information may also be stored in the auxiliary database. In an alternate embodiment, the auxiliary database can itself be embedded within memory 11.

In some exemplary embodiments of a system and its use provided herein, access to making search queries of the property records database is restricted to those possessing a license, permit, or any other selected verifiable information within a political jurisdiction. In some embodiments, the license is a real estate license and the political jurisdiction is a state within the United States of America. Thus, a system as provided herein in some embodiments restricts access to making search queries of the property records database to persons having an up-to-date real estate license. Implementation of this feature is achieved using the same or analogous technology that is known in the art that employed by the Texas Department of Public Safety at www.txdps.state.ts.us for internet-based verification of the existence of a license to drive, whereby persons are given online ability, for example, to request a verified copy of their type #3A driving record. Such means of verifying a current license, government-issued permit, or any other verifiable information, etc., possessed by a user can also include other systems of verification known in the art employed by merchants in their accepting credit cards of buyers operating on line, including verification methods/criteria used by the PAYPAL® service as a non-limiting example. Another example of verification is that used by the United States Veterans Administration wherein a person's social security number is used in conjunction with personal information. Verification typically includes the system's accessing a database containing records of license holders for comparative purposes with credentials and/or information provided by a user of the system. The database used may be external to the system herein, as described in reference to a maps database, or in alternative embodiments the database used may be resident in the system. In some embodiments, for cases in which a system as provided herein does not receive verification of a person attempting to use the system as having a valid real estate license, access to the property records database is denied to that person.

A system according to illustrative embodiments of the disclosure also contains, additional to other elements present in cooperative connection, an accounting module 7 which keeps a tally on the number of times a record for a property listed by a seller is clicked on or accessed by a buyer using the system. The accounting module uses conventional counter technology known to those skilled in the art and associates counts registered with the identity of a record in the property records database. If a builder of new housing construction opens an account on the system and lists only one new home for sale on the system (a single record in the properties records database), and if the record for that particular property is clicked on or accessed by a potential buyer or their agent through the system, say 57 times over the course of one month or any other billing cycle interval defined and employed by the system's administrator, then according to one embodiment the builder providing the property will be sent an invoice or their account charged in an amount that is based on the number of times a record concerning his property was clicked or viewed. Accordingly, in some embodiments if a single builder lists a plurality of properties, the system will count how many times each of that single builder's listed properties are clicked or accessed over a billing cycle interval, provide a sum of the total number of accesses made and invoice or charge the builder's account an amount based on the total accesses of the builder's properties. A system provided herein enables a real estate agent to carry out a variety of actions, each of which alone or combined with other actions offers different advantages to a builder/seller, and in some embodiments a different cost structure is applied to each action the agent performs using the system. For example, in one embodiment when a user clicks on a particular balloon on the map, a bubble is opened that includes data relating to the property that might be enough to convince the agent they want to see more detail, or avoid the property altogether. In one embodiment the cost for clicking the balloon is 25 cents. If the agent decides they want to view a complete detail page either from a link caused to be present by the system in the bubble or directly from the search results list, the cost in one embodiment is one dollar, based on transfer of a greater amount of data than associated with clicking the balloon. For instances in which the agent feels that the property is a good fit for a client they have in mind, the agent can either email it or print it out with their own contact data to give to their client. The cost to do so to the builder/seller is three dollars in some embodiments. When that action is complete, the system also provides the builder with contact information for the agent and the buyer if the agent has pre-registered their buyer information. In most instances, such would represent an indication that the agent intends to bring that buyer directly to the property under consideration. For this and some other embodiments, the system is configured to prevent charging the account of the same agent for second and subsequent clicks on a property record that that same agent has already viewed in the past using the system. This is accomplished easily using techniques and equipment known to those skilled in the art to provide a logic circuit that detects whether a particular agent who has clicked on a hyperlink, has clicked on that same property record description in the past. For cases when they have not, a charge is electronically tallied and for cases when they have, no charge is tallied. In some embodiments the seller is billed at a flat rate up to a maximum number of access counts registered in accounting module 7, and a per-click rate beyond that maximum. In another embodiment, a seller pays a pre-determined flat fee and there is no restriction made on the number of clicks or accesses to that seller's properties by buyers during a billing period or any other time interval selected by the system's administrator. Thus, a system as provided can accommodate and offer multiple different payment plans for sellers, including without limitation, pay per click plans, flat-rate plans, and combinations thereof.

Figure 2:
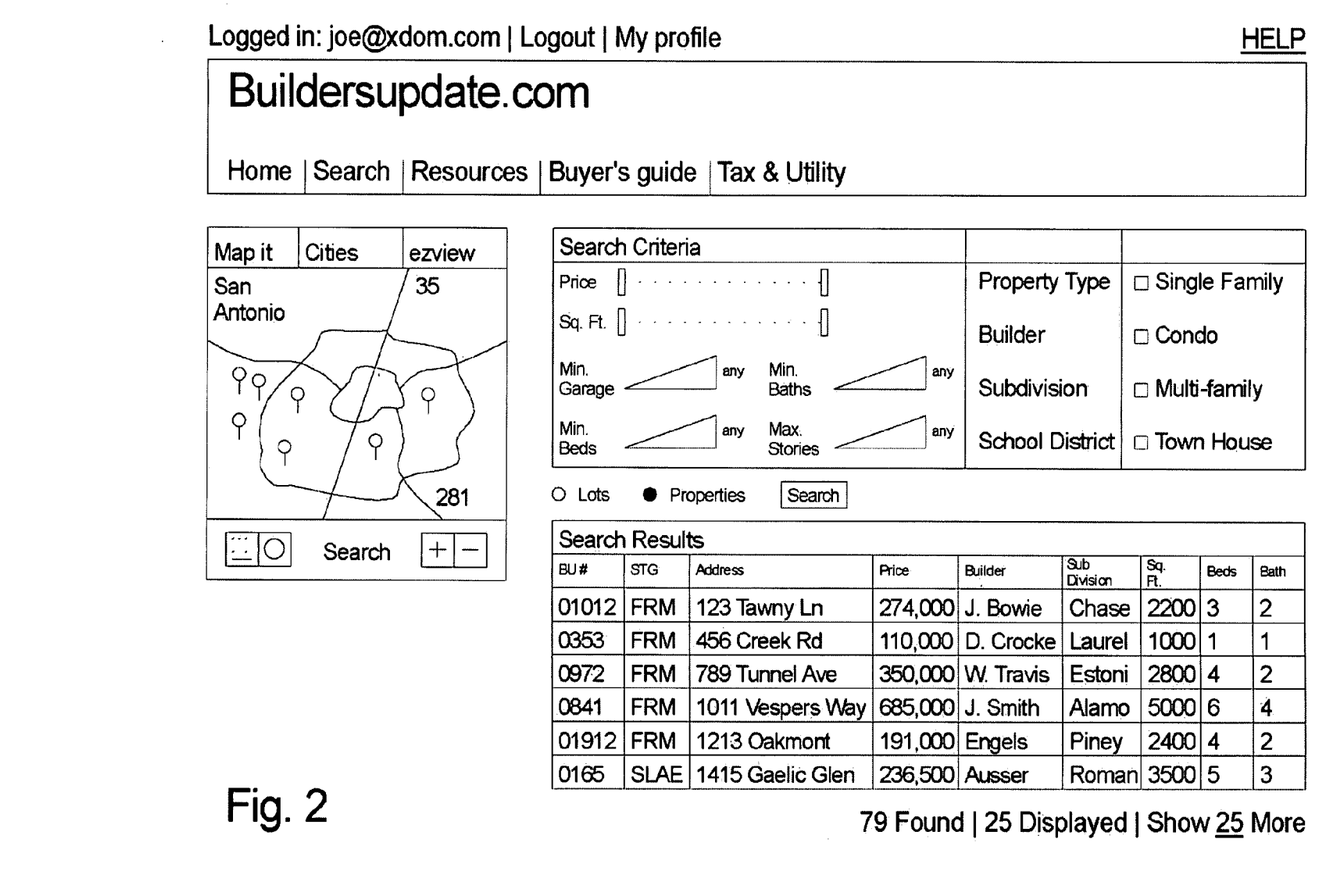
FIG. 2 is an illustration of information displayed on the monitor of a computer of a user accessing a system according to an illustrative embodiment of the disclosure.

FIG. 2 is an illustration of how the output of a system as provided herein appears on the screen of a computer of a remote user of the system in some illustrative embodiments, a system according to the disclosure providing various screen-outputs dependent on the clicking of hyperlinks present on the "pages" the system provides to appear on the user's computer screen or monitor. Towards the top of this screen is an indicator of the identity of the user who is logged on to the system, followed by optionally-clickable hyperlinks enabling the user to logoff the system or access their personal profile page. When clicked, the personal profile page link leads the user to a system page at which they can view their personal and identification information typical of personal profile pages, including their identity, location, office affiliation, photographs, credit card information and a signature file. In illustrative embodiments a system provided herein in general causes pages to appear on the user's computer screen or display in similar fashion as many internet website's pages appear. There is also a page header, including the site name and various and sundry options listed in hyperlink form including: a hyperlink to the home page location, a hyperlink that leads to the search query page location, a hyperlink leading to resources useful in connection with real estate transactions such as loan calculators and other useful information relating to assisting buyers settle into a new home, a hyperlink leading to the site's buyer's guide page that provides information to buyers concerning the real estate transaction process and optionally legal considerations, and a hyperlink leading to the site's page which is concerned with issues relating to real estate taxes and utilities. Other hyperlinks may also be present leading to other pages on the site which contain beneficial information as deemed by the system's administrator. Files containing remote computer readable web pages, images and other referenced features may be stored in any location indicated herein as having computer-readable memory.

In some embodiments there is a search criteria section provided in web page format by the system that is accessible by authorized users on remote computers, as shown in FIG. 2. The search criteria section is the location at which a user of the system specifies their desired search criteria to be used in making a database query of the property records database 11.

One of the criteria upon which a search query of the properties records database may be based is the price information of properties present therein, and according to illustrative embodiments of the invention it is possible to specify a range of prices in the search criteria section by adjusting the locations of two bars presented thereon, a left-side bar defining the lower end of the desired pricing range and a right-side bar defining the upper end of the desired pricing range, the two bars being slidable on the screen by holding one's cursor over a given bar, pressing a mouse button while doing so and sliding the bar to its desired position, with a digital output visibly denominated in currency units being displayed adjacent to the slidable bars or at some other conspicuous location showing the lower end and upper end of the price range currently selected for the database query about to be made. However, other functionally-equivalent and known means for specifying a range of a searchable field for a search engine to execute during a search query of a database known to those skilled in the art may be employed for selecting a price range, and any other ranges described herein or known to be applicable in reference to describing real property, including the use of drop-down windows, fill-in fields, text fields, and radio buttons may be employed.

Another criteria upon which a search query of the properties records database may be based is the living space associated with each of the properties, denominated in square feet. In some embodiments of the invention there are slidable bars and an adjacent digital readout relating to user-selectable range parameters concerning the square footage of a dwelling on a property as an additional search query criteria, just as was present for the search query price range definition.

Another criteria upon which a search query of the properties records database may be based is the amount of garage space associated with each of the properties. On the search page of a screen of a remote computer connected to a system according to some embodiments of the disclosure there is provided capability for selecting a desirable amount of garage space, which may include a slidable bar that is moveable by the user by hovering their cursor over the bar, holding down a mouse button, and dragging the slidable bar to a location that causes the desired amount of garage space to be displayed in digital form adjacent to the bar or at some other conspicuous location. However, other functionally-equivalent ways to specify an individual value, minimum value, or maximum value of a parameter of a searchable field for a search engine to execute during a search query of a database known to those skilled in the art may be employed for selecting a garage space amount, and any other individual values described herein or known to be applicable in reference to describing real property, including the use of drop-down windows, fill-in fields, text fields, and radio buttons may be employed.

Another criteria upon which a search query of the properties records database may be based is the number of bedrooms in dwellings associated with each of the properties. On the search page of a screen of a remote computer connected to a system according to some embodiments of the disclosure there is provided capability for selecting a desirable number of bedrooms, which may include a slidable bar that is moveable by the user by hovering their cursor over the bar, holding down a mouse button, and dragging the slidable bar to a location that causes the desired number of bedrooms to be displayed in digital form.

Another criteria upon which a search query of the properties records database may be based is the number of bathrooms in dwellings associated with each of the properties. On the search page of a screen of a remote computer connected to a system according to some embodiments of this disclosure there is provided capability for selecting a desirable number of bathrooms, which may include a slidable bar that is moveable by the user by hovering their cursor over the bar, holding down a mouse button, and dragging the slidable bar to a location that causes the desired number of bathrooms to be displayed in digital form.

Another criteria upon which a search query of the properties records database may be based is the number of floors or stories associated with each of the properties. On the search page of a screen of a remote computer connected to a system according to some embodiments of the disclosure there is provided capability for selecting a desirable number of floors or stories, which may include a slidable bar that is moveable by the user by hovering their cursor over the bar, holding down a mouse button, and dragging the slidable bar to a location that causes the desired number of floors or stories to be displayed in digital form.

The aforesaid search criteria of price, square footage of a dwelling, garage space, number of bathrooms, number of bedrooms, and number of floors or stories are those for which fields exist within the property records database associated with each property present therein, in illustrative embodiments of the disclosure. However, other fields and hence search criteria may be created by the systems' administrator. In some embodiments, the search of the property records database will be cumulative, that is, in a single search query all of the foregoing features will be searched for simultaneously by the search engine in a single search, and the results generated will feature properties having all of the characteristics specified by the user. At the option of the user, any one or more of these criteria may be effectively omitted, such as by in the case of desiring to see properties of all price, one adjusts the lower range to $1 and the upper range to a very high dollar amount, or in the case of desiring to see all homes with garages, the minimum amount of garage space may be set to an option specifying "any number" of garages. A system according to some embodiments of the disclosure includes accommodation of search queries based on further searchable fields such as the property type, which may without limitation, be based on such fields as the name of the builder, a particular geographical area or subdivision, and school district. Selection of one of these property types is in some embodiments made by checking a box or alternately highlighting a button on the search screen prior to executing a search query. Moreover, additional potential search fields can include the type of dwelling, be it a single family home, condominium, multi-family dwelling, town house, etc., which selection can be made by checking a box or alternately highlighting a button on the search screen prior to executing a search query. Thus, by one non-limiting example, a person seeking a new home to purchase may register to gain access to the system and upon gaining access navigate their browser to the search page. The user then specifies a price range of between $150,000 and $175,000, a square foot range of 1000 to 1500 square feet, a minimum of one car garage, a minimum of three bedrooms, a minimum of two bathrooms, a single floor layout ranch style dwelling that is a single family home, built by a particular selected builder. Once these parameters have been specified, the user then clicks on the search button, which executes a search query causing the search engine to use the specified criteria in locating all records in the property records database meeting the criteria specified, and the results are quickly displayed in a Search Results table, whose format in one embodiment is shown in FIG. 2, although the results listed therein are not a result of this particular search but are provided only as exemplary. In some embodiments, the search criteria are cumulative, that is, all specified criteria are taken into account by the search engine when making a query of the property records database. Various features of a system described herein may be functionalized by providing radio buttons to the view of a network-viewable page, such as in the search criteria section shown in FIG. 2. In one embodiment, two clickable radio buttons are provided, with one radio button representing a default setting (such as "properties") and the remaining radio button representing a clickable option, such as "available lots". In one embodiment upon initial presentation to a viewer, the system is defaulted to providing a page view that permits entry of search query criteria that will be used in querying among properties featuring new home construction only, not including available lots. By clicking on the "available lots" radio button, the system limits records searched in a query as only relating only to vacant land. In another embodiment, a plurality of radio buttons are present relating to the language used on a viewable page provided by the system to a user. In one embodiment, two radio buttons are present, one being English and the other being Spanish, and by clicking on one or the other the user selects the language desired. Such a feature is implemented using known language translation software operatively linked to the system. Thus, as used herein, real estate properties includes both available lots having no construction on them, and land containing a dwelling that is new home construction.

A map is caused to be displayed on the screen by the system as shown in FIG. 2, and at the same time, approximately the same time or shortly thereafter in various embodiments, the Search Results table is generated, the locations of each property identified by the search query are plotted on the map, in the form of markers which in one embodiment appear as tiny balloon-like markings, as shown. The map sub-section is preferably provided with tools typically used with computer-based mapping systems, including a zoom feature.

In some embodiments the Search Results displays the various search criteria for each property, including price, identity of the builder for new construction, the subdivision, square footage, number of bedrooms, number of baths, and further provides the street address location of the properties to the user. In some embodiments, the first column of the Search Results table includes the BU number, which is an internal code used by the system as a unique identifier for each property within the property records database. One user option is the presence of a checkbox adjacent to the BU number or alternately any location adjacent to a listing, which when checked by the user clicking with their mouse, re-locates the property so selected to a separate table. In one non-limiting example, a user may find that three properties out of all presented in a Search Results table are most appealing, and may easily re-locate these properties to another table for hard-copy printing or later viewing by saving selected entries among the results to memory. Subsequently, the buyer may choose to personally visit properties identified by a search query, and the provider of the property and buyer may consummate a sale.

Additional features present on the search screen page exemplified by that of FIG. 2 can optionally include a listing at the bottom indicating the number of properties found by a given search query of the property records database, the number of properties displayed, and a highlighted hyperlink enabling a user to access additional search results not shown on the immediate screen view by clicking on the hyperlink.

As mentioned, when accessing the system a user is presented with an options menu. The options menu includes the options of searching the property records database in addition to the option of creating a new property record or modifying an already-existing record in the property records database. When a seller selects the option of creating a new record to be posted in the property records database, the process control module 5 submits commands to the database management module 9, which in turn passes information for the fields of the specified base from the user's computer through the communication port into the selected database record. In one embodiment, the fields in a property record in the property records database are populated through use of a form presented to the seller, which may optionally include a field for a user password and a field that is used to designate the record as a submission to the property records database. The seller may be presented with an option of maintaining the record in the property records database without its being accessible or locatable by search queries conducted by other users, or to make the record active and subject to identification by search queries of one or more buyers. A system according to the disclosure is not necessarily limited to any exact physical file, record and field structures described herein, as other structures that are functionally equivalent from a logical standpoint are equivalent for providing a system having the functionality provided by this disclosure as those skilled in this art immediately recognize.

In some embodiments of a system according to the disclosure, a DELL PowerEdge® 2850 WIN2K3 server computer available from DELL CORPORATION of Austin, Tex. is employed as a source of the various components of the system 10 of FIG. 1, is connected to the internet or any other selected network, and buyers and sellers may each use their own personal computers disposed at remote locations from the server computer, in implementing methods according to the disclosure that use the system, the computers disposed at remote locations being connected to the server computer in one embodiment via an internet connection.

The search engine 13 is invoked in some embodiments when a buyer selects the properties records database option from a menu, which may be the opening (initial) menu presented to a user at a remote computer by a system of this disclosure. In some embodiments, when the search engine is invoked to search the property records database, a number of scroll bar type menus is presented to the user. The scroll bar menus can correspond in different selected embodiments to some or all of the various search parameters and fields associated with or relating to a property record in the property records database. The menu presents predetermined options corresponding to the available entries for the various fields. The user then selects query entries from the options presented. In an alternate embodiment, fields which are not limited to predetermined entries may be queried using a key word or literal string inquiry, such as for a swimming pool, guest house, barn or other features associated with real property, in addition to, or in lieu of the fields associated with predetermined entries. The search engine returns an indication of the number of property records that satisfy the query parameters, and additional iterations of the search may be executed, for example if too large a number of results are returned, the user may narrow down the search results by selecting additional features or narrowing a selected range, for example by modifying the price range or any other range or parameter. Then, of the records initially identified in the query, after additional parameters have been specified, re-presentation of search query results are provided by the system to the user, such re-presentation typically containing fewer search results (properties identified) than an initial query. Thus, search engine 13 is configured to operate as an iterative search engine when desired.

A system according to this disclosure is accessible online over the internet at the web address http://www.buildersupdate.com. While described and disclosed in relation to the sales of new home construction for the real estate market, a system according to the disclosure can also be used in facilitating transactions between buyers and sellers in other areas of commerce, essentially unlimited, the sellers not being limited to providers of new home construction. The property records database may also be caused to contain searchable records of pre-owned homes. A system as provided herein has applicability to any product or service having features that can be downloaded into a database record concerning that product or service and having searchable fields. This includes without limitation commodities; existing homes; services; brokered services; goods or services sold which include a contract having commissioned sales; commercial real estate properties including vacant land (available lots) and land with dwellings, buildings or other construction; financial securities; commodities; heavy equipment; motorized vehicles; sea-going vessels; medical/health care; specialty materials; and aircraft.

Figure 3:
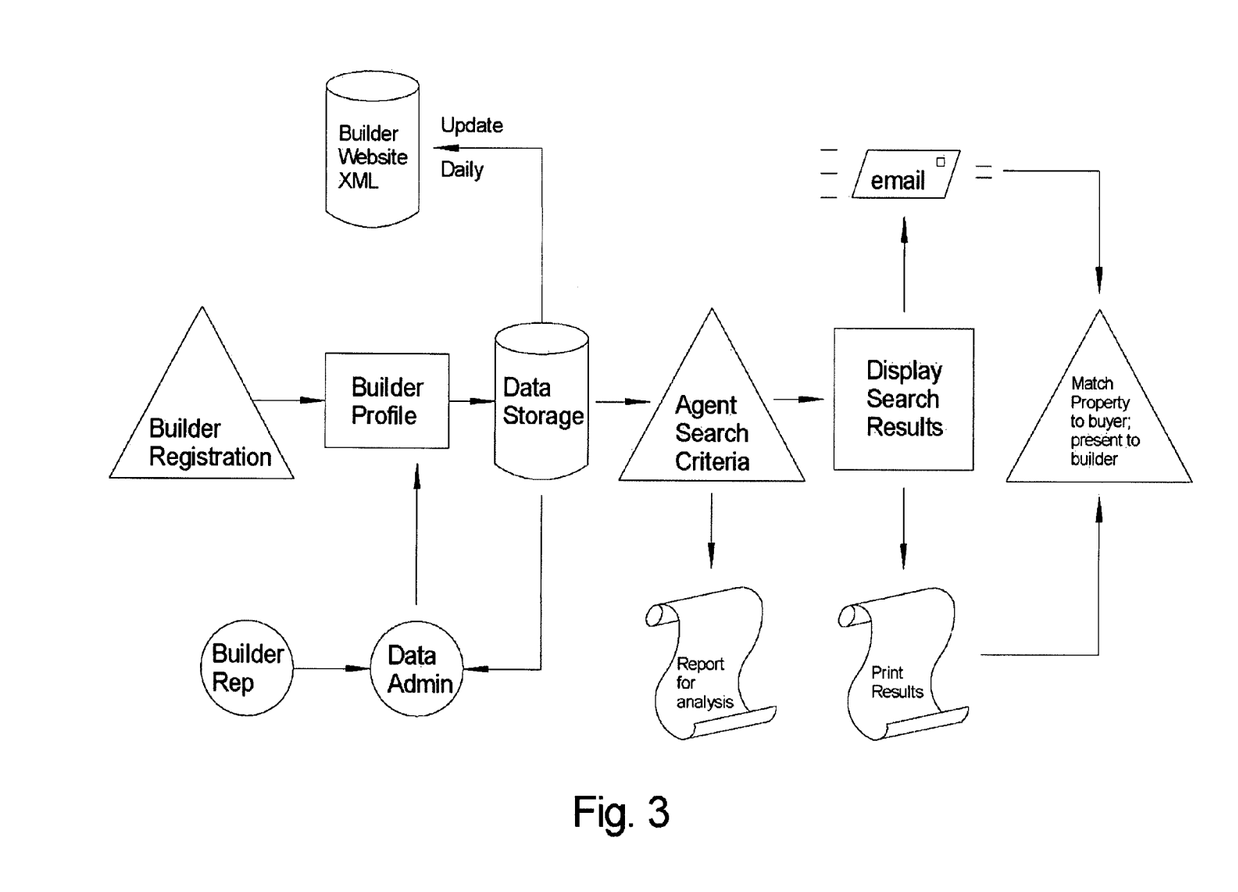
FIG. 3 depicts a flowchart of activity associated with operation or use of a system according to some embodiments of the disclosure.

FIG. 3 depicts a flowchart of activity associated with operation or use of a system according to some embodiments of the disclosure. In one embodiment a builder of new homes (seller) registers online with a system according to the disclosure, establishing an account and creating a profile by providing information concerning themselves or their company, the information being stored in a data storage location in the system, which is electronic memory as earlier described. The builder is then given write access to be able to upload records of properties featuring new home construction that they desire to offer for sale into the property records database, denoted in this FIG. 3 as Builder website XML. Builder website XML in this context may comprise the website of the builder that is electronically stored in a system other than that provided by this disclosure through a network connection using appropriate selected known access protocols, or may also be resident in memory of a system as herein provided, in database memory 11 or other memory present. In some embodiments of use of a system as provided herein, the entries in the property records database that are associated with a particular individual builder are updated for accuracy on a daily basis, by the builder themselves or their representative logging into a system such as system 10.

A user may be an Agent who enters search criteria to the system upon which the search engine makes a query that generates search results, which results are stored in a database for analysis at another time. Search results are also displayed on the computer monitor of the Agent user and may be printed in a hard copy report. The Agent user may also provide the search results to a prospective buyer, either by an email communication or by delivering a hard copy report to a prospective buyer, who may make a subsequent offer for presentation to the builder.

In some embodiments, a system as provided herein is operatively connected to an automated telephone call center and configured to execute an automated telephone call (on any chosen periodical basis) to the seller. Upon the telephone's being answered, an automated voice identifies itself as being representative of system 10 and offers a menu of options selectable by the call recipient depressing one or more buttons on their touch-tone keypad or by voice-recognition, with one option being for the recipient to indicate that they would like to update their records, at which point the automated call center switches the recipient over to a living person system administrator who then speaks with the builder and effects the changes.

In some embodiments the records in the property records database of a system herein each include a timestamp/datestamp on the record, that is displayed to a viewer, which is typically a buyer or agent. Such feature enables the buyer or agent to know how "fresh" the information contained in the record is, that is—when it was last updated by the seller. In some embodiments, the display of search results shown in FIG. 2 prioritizes the listing of property records shown based on how fresh they are. That is, the listings which appear first or topmost in the list of search results are those whose seller's have most-recently updated the information present in those listings. Such a feature is readily effected, by sorting records in the property records database based on the timestamp/datestamp that each record was last updated. Thus in some embodiments, results from a search query are provided and then sorted by their freshness prior to being displayed in the search results window. This feature provides incentive to sellers to always make certain that the records they enter into the system contain the most complete, up-to-the-minute accurate information as reasonably possible, to ensure the highest level of real-time accuracy of the contents of the property records database. Such features are readily implemented in a system provided herein when the system is further provided with a system clock operatively connected to either the database manager or process control module. A time and date field is created and associated with each record present in the property records database and a timestamp/datestamp is entered into the time and date fields for each record in the property records database upon their creation, modification, or in response to a periodic telephone-generated indication that there are no changes. Thus, in some embodiments the system is configured to sort results generated as a result of a particular given search query based not only on features described in property records, but also based on the timestamp/datestamp fields, in chronological order. Sorting, when and as used herein shall be understood as including conventional techniques, algorithms and equipment known in the art as being useful in sorting records stored in computer-readable memory.

For instances when an automatic telephone call is made by the system to a seller seeking an indication of whether the seller has any changes or updates to any of their records in the property records database and the call-recipient seller indicates they have no changes or updates to any of their records, the system is configured to automatically update the timestamp/datestamp for each of that seller's records present in the database to the current time of the phone call. In one embodiment such an automated telephone call is made on a weekly basis, however, any time period may be selected to pass between successive automated calls are made.

A system according to the disclosure is capable of storing thousands and more individual records relating to individual properties of new home construction in database memory 11. When a remote user such as a buyer using a remote computer conducts a search query, results are provided to the user generally in less than 10 seconds from when the user executes the search query. In some embodiments results are provided to the user in fewer than five seconds from when the search is executed. In some embodiments, search query results may include any number of individual property records between about 1 and about 50 records from the property records database, including all numbers and ranges between about 1 and about 50, and including 1 and 50. A system according to this disclosure is typically capable of providing search results including these numbers of property records from a properties records database containing hundreds of entries.

Thus, a system provided herein enables builders having accounts with the system in illustrative embodiments to add their property records to the property records database, modify their records, delete their records, and also have access to knowledge of who has been viewing the records they have posted into the property records database. A system according to the disclosure is advantageous to a builder, in that their marketing costs are substantially lowered through its use, compared to currently-existing marketing methods. Builders are able to gain free time, by eliminating the need to manage their marketing efforts through conventional or prior art methods or systems. Further, builders are able to extract analytics that have never been available to them from prior art methods or systems previously, due to the new function conferred by a system herein. Trends data derived therefrom can be of immense aid in providing an appropriate inventory to anticipate market needs in both current and future times.

Using pre-registration of clients, potential conflicts can be avoided and a mechanism provided whereby email communications made possible by collection of email addresses by the system enables builders to broadcast important information to the entire community of buyers' agents who are registered with the system, or selected segments thereof, the email addresses of the agents being readily retrievable by the database manager and process control module. In one aspect, to protect the initiative of the real estate agent that has introduced a buyer to a prospective seller, a system as provided herein is configured to enable real estate agents to purchase a license for their clients, which license can be an individual license or a bundled package of individual licenses. These licenses enable clients (buyers) designated by the agent access to use the search engine feature of a system provided herein in locating records of properties of particular interest. The searching activity of the agent's clients is monitored and recorded in computer memory present in recorder 15 for later extraction and sorting to enable generation of a report that shows the buyer's searching activities. When appropriate or desired, the real estate agent may subsequently transmit a pre-registration form to a specific builder on behalf of their client, introducing them to the builder with contact information useful in the event the client decides to physically view a property for example on their own initiative and travel. In some embodiments, the pre-registration including the potential buyer/client's information is timestamped/datestamped at the time it is sent from the agent to the builder.

At the time of creation of an account with the system by either a buyer or seller, these users are prompted to enter an email address for themselves as part of the process of becoming registered users. In one embodiment, a system as provided is configured to send emails internally between various registered users. In another embodiment, a system as provided is configured to send emails between various registered users through servers and systems external to the instant system, using such configurations as are known to those skilled in the art. In some embodiments, when a real estate agent sends information via an email communication using the system herein to a registered user who is the agent's client, the builder will have the ability to view the name of the buyer and their contact information, in addition to the real estate agent's contact information. In a further embodiment a system as provided enables a user to contact other users directly using various communication media including without limitation voice-over-internet communications such as those available from www.skype.com, and text-over-internet instant messaging such as those available from MSN, Yahoo!, and Google. The presence of such features is provided using techniques and equipment known to those skilled in the art in providing a clickable link on a network-accessible viewable page provided by the system that opens a SKYPE® window or text-messaging window on a user's computer monitor. In one embodiment, a user enters their own telephone number, and is responsible for communications charges between themselves and other users, charges being made using techniques and equipment known to those skilled in the art. In one embodiment the user providing the telephone number is a seller.

Thus, a system provided herein provides buyers' agents with an ability to acquire all necessary information upon which decisions regarding purchase of a new home. Data in the system is as up-to-date and accurate as possible, since the builders have the ability to ensure its accuracy directly and quickly, effectively immediately at any given time. Buyers' agent's commissions are protected by the pre-registration process enabled by a system provided herein, and by reviewing search engine queries conducted by clients, agents can remain informed of clients' interests.

Another feature a system as provided herein may include is a custom spec homes feature. This is suited for use in many embodiments and including those for which vacant land is being offered by a seller, who is a builder. The system is configured to receive and store in computer-memory a plurality of home floor plans, layouts, or architectural options offered by a particular given builder. That is, the builder may upload a plurality of possible choices of architecture/plans for buyers to review, and associate such plurality of choices with a plurality of records in the property records database relating to vacant lots. For example, if a builder offers four different new home construction choices and has eight lots of vacant land listed in the property records database, when a buyer or their agent accesses a single vacant lot for review of the features present in its records, an option is indicated to the buyer or agent to select one of the four choices to be associated with the particular lot being viewed. An option is provided to "advance" the choice of new home construction to the next one offered by the builder and by repeatedly advancing the selection, all of the construction offerings of that particular builder applicable to the vacant lot being considered may be seen.

A system according to exemplary embodiments of the inventions provided by this disclosure provides agents for buyers of new home construction and available lots with 24 hour, 7-day access to up-to-date inventory, enabling a new tool for agents to facilitate sales of new home inventory, increasing the velocity of money in the real estate economy. Additionally, it provides any real time data necessary to facilitate all aspects of the search for new homes that buyers might need, above and beyond inventory information. A system according to the disclosure further provides links and quick access to information agents might need to assist their overall business practices. A system as provided herein further provides a means by which agents can identify their buyers to builders to protect their efforts to bring about a sale.

In one non-limiting, exemplary method according to the invention, a tangible collection of information relating to features of real property for sale, which in non-limiting exemplary embodiments exists in the form of printed characters present on paper or other conventionally-recognized storage media (which includes computer-readable storage media), is transformed into electronic signals. This may occur in more than one way, one way being when a builder enters information relating to a property record using their remote computer into the property records database of a system as described herein, employing the various machine elements described herein operating in cooperative fashion with one another. The electronic signals representing a transform of that information (which can include carrier waves, electrical impulses, a series of electrical impulses, binary-coded electromagnetic energy, as are known in the art) are transmitted via a medium which supports propagation and transmittal of electronic signals (which can include conductive wires as a medium, and the earth's atmosphere as a medium in the case when a wireless transmittal system is employed that includes a wireless transmitter and wireless receiver, operatively connected respectively to computers used in a system as described, as such and their implementation are known in the art) and are received by a system according to the disclosure via communication port 3 and subsequently directed to be stored in property records database, in one embodiment located in database memory 11, for storage. In this fashion, a tangible collection of information relating to features of real property for sale is in one embodiment transformed into an electronic format at a builder's remote computer, transmitted to a system according to the disclosure, and caused to be again transformed but this time into a computer-readable or machine-readable format, and stored on a computer-readable medium such as database memory 11 or optionally other memory present in the system. The computer-readable medium itself is tangible in the sense that database memory 11 is typically a physical article comprising memory elements mounted on a support including controlling circuitry, the database memory 11 being capable of being physically removed from a system according to the disclosure, such as for inspection, repair, replacement, copying, physical transportation, or any other desired known and useful purpose relative to computer components. The processes involved in causing the formerly-tangible collection of information to become present in computer-readable or machine-readable format in database memory 11 effects changes in the configuration of the states of a plurality of physical memory elements present in database memory 11, in the case of when binary language is employed, many zero states may become ones states and vice versa as is generally known in the art of computer memory. Subsequently, a remote user such as a buyer may act through their remote computer connected to a system as provided herein, to perform a search query of the database memory 11, and results of such queries generally include a subset of all information present in the formerly-tangible collection of information sent to the system by the builder. The search query results are subsequently transformed into electronic signals and transmitted via a medium as when the builder had sent the formerly-tangible collection of information to the system, transmitted to the remote user's computer, where the electronic signals themselves are once again transformed into a human-readable format, such as the English or other languages, and displayed on a computer monitor (screen), again transformed and stored in memory present in the buyer's computer in a computer-readable format, or caused to be printed on paper, thus providing a tangible collection of information relating to features of real property for sale, which is in some embodiments a subset of that transmitted by the builder or a plurality of builders to the system. In some embodiments, the tangible collection of information relating to features of real property for sale obtained from a search query in the above fashion by a buyer from the system comprises a subset of all of the information present in database memory 11 and includes information relating to features of real property for sale that is provided to the system by a plurality of builders. Thus, this disclosure provides for repeated transformations, from a tangible collection of information containing human-readable characters, to electronic signals, to physical changes in computer memory, and following extraction of a subset of the physical changes to the computer memory, that subset is again transformed to electronic signals which are moved to another location and re-transformed into human-readable characters comprising only a subset of the original tangible collection of information. In exemplary embodiments, storage in computer-readable medium may be transient, semi-permanent, and permanent.

Various features and aspects of a system provided herein have been described with reference to exemplary embodiments. One of ordinary skill recognizes that some of the features and aspects described may be optional in some embodiments. Thus, a system as provided herein may or may not include all features and aspects described herein necessarily, but may be custom tailored to provide a system in a combination that appeals most to users, which may vary from city to city, region to region, among counties, countries, etc dependent on the needs of the market in the region under consideration. Thus a versatility of a system according to this disclosure is that it may be made to comprise wide variety of features and aspects described. Some embodiments do not include verification of a person having a real estate license, while other embodiments do. This versatility in the administration being able to employ different sets of described aspects of a system as provided adds value. Where components herein specified are indicated as being operatively connected to one another, such connection includes their being in effective electrical communication with one another sufficiently to achieve outcomes herein described. This disclosure includes the combination of the features and/or limitations of any dependent claim, singly or in combination with features and/or limitations of any one or more than one of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another of the independent claims to arrive at a modified independent claim, with the remaining dependent claims in their original text or as modified per the foregoing, being read and applied to any independent claim so modified. The present invention has been disclosed and claimed with the intent to cover modifications that achieve substantially the same results as herein taught using substantially the same or similar structures and/or methods based at least in part on this disclosure. Accordingly, it is intended that the invention not be limited to the disclosed embodiments, but that it have the full scope permitted by the language of the following claims.

The invention claimed is:

1. System for information transformation and exchange comprising:
 a) a database containing a plurality of computer-readable records relating to real estate properties that are available for purchase, stored in computer-readable memory, wherein said records each contain a plurality of search engine query-searchable fields relating to features of a real estate property;
 b) a communication port suitable for transmitting and receiving data and instructions in the form of electrical signals, to and from remote computers;
 c) a database manager for creating user accounts and creating, modifying, and deleting entries present in said database, said database manager being connected to said computer-readable memory responsive to a plurality of said remote computers;
 d) a database query engine operatively connected to said memory, said engine configured to permit a features-based search of said plurality of computer-readable records by system users;
 e) a process controller operatively connected to at least one of said database manager and said search engine; and
 f) a recorder for recording the number of times records are selected for viewing by users.

2. A system according to claim 1 wherein said recorder further records the identities of users who have selected each particular record.

3. A system according to claim 2 wherein said recorder is configured to associate at least some users with some of the records selected.

4. A system according to claim 1 further comprising a maps database operatively connected thereto.

5. A system according to claim 2 wherein said maps database is located external to said system and accessed over a computer network via a maps database port.

6. A system according to claim 1 wherein users are required to establish accounts with said system prior to being granted access to employ said search query engine in a property records database search query.

7. A system according to claim 6 wherein access requires a user to possess a license issued by a political jurisdiction.

8. A system according to claim 7 wherein access requires a user to be a licensed real estate agent.

9. A system according to claim 1 further comprising an auxiliary database operatively connected thereto.

10. A system according to claim 1 further comprising an accounting module for charging fees for use of said system to the account of a seller, based on the number of times that seller's property records present in the property records database were viewed by a user that is not a seller.

11. A system according to claim 10 wherein said seller is a builder of new home construction.

12. A system according to claim 1 wherein each of said records in said property records database has associated with it a timestamp that reflects when the information present in each record was last updated.

13. A system according to claim 12 further comprising an automated call center operatively connected to said system, said automated call center being configured to automatically generate a telephone call to sellers of property who have listed at least one record in the property records database.

14. A system according to claim 13 wherein said telephone call provides the recipient with a touch-tone or voice selectable option, to indicate the seller either has updates to at least one record in the property records database, or that the seller has no updates to make to any of said records.

15. A system according to claim 14 wherein the timestamps of records present in the property records database associated with a particular seller who is the recipient of said telephone call are updated to the time at which said telephone call is made, for cases when the seller indicates by voice or touch-tone selection there are to be no changes or updates to any of the information contained in that seller's records in the property records database.

16. A system according to claim 14 wherein the recipient of said telephone call is re-directed to a live telephone operator for cases when the seller indicates by voice or touch-tone selection that there are changes or updates to information contained in that seller's records in the property records database.

17. System for information transformation and exchange comprising:
   a) a database containing a plurality of computer-readable records relating to real estate properties that are available for purchase, stored in computer-readable memory, wherein said records each contain a plurality of search engine query-searchable fields relating to features of a real estate property;
   b) a communication port suitable for transmitting and receiving data and instructions in the form of electrical signals, to and from remote computers;
   c) a database manager for creating, modifying, and deleting entries present in said database, said database manager being connected to said computer-readable memory responsive to a plurality of said remote computers;
   d) a database query engine operatively connected to said memory, said engine configured to permit a features-based search of said plurality of computer-readable records by system users;
   e) a process controller operatively connected to at least one of said database manager and said search engine;
   f) a recorder for recording the number of times records are selected for viewing by users;
   g) a maps database operatively connected to at least one component selected from the group consisting of: said process controller and said database manager; and
   h) an accounting module for determining and charging fees for use of said system to the account of a seller, based on the number of times that seller's property records present in the property records database were viewed by a user that is not a seller.

18. A system according to claim 17 wherein said accounting module is operatively connected to said recorder.

19. A system according to claim 17 wherein said system is configured to transmit driving instructions to a user who is not a seller, from a location effectively specified by said user who is not a seller, to any selected property described in records relating to real estate properties in said database.

20. A system according to claim 17 wherein a user stationed at a remote computer is provided with an option to select a desired human-readable language in which pages served by said system to said user are displayed on said user's computer screen or monitor.

21. A system according to claim 17 wherein said system is configured to permit registered users at remote locations from one another to communicate with one another using a communication method selected from the group consisting of voice-over-internet and text-messaging methods.

* * * * *